United States Patent
Oyaizu (10) Patent No.: US 10,927,921 B2
(45) Date of Patent: Feb. 23, 2021

(54) METHOD OF MANUFACTURING LIQUID-SEALED ANTIVIBRATION DEVICE AND MANUFACTURING APPARATUS OF LIQUID-SEALED ANTIVIBRATION DEVICE

(71) Applicant: Toyo Tire & Rubber Co., Ltd., Itami (JP)

(72) Inventor: Kei Oyaizu, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 211 days.

(21) Appl. No.: 16/175,253

(22) Filed: Oct. 30, 2018

(65) Prior Publication Data

US 2019/0145487 A1 May 16, 2019

(30) Foreign Application Priority Data

Nov. 13, 2017 (JP) .............................. JP2017-218611

(51) Int. Cl.
*F16F 13/10* (2006.01)
*B60K 5/12* (2006.01)

(52) U.S. Cl.
CPC .......... *F16F 13/103* (2013.01); *B60K 5/1208* (2013.01); *F16F 2226/04* (2013.01); *F16F 2230/30* (2013.01)

(58) Field of Classification Search
CPC .. F16F 13/103; F16F 2226/04; F16F 2230/30; B60K 5/1208
See application file for complete search history.

(56) References Cited

U.S. PATENT DOCUMENTS

| 6,662,833 | B2* | 12/2003 | Tsujimoto | ............... | F16F 13/06 141/269 |
| 6,810,582 | B2* | 11/2004 | Tsujimoto | ............... | F16F 13/06 248/636 |
| 2003/0183302 | A1* | 10/2003 | Tsujimoto | ............... | F16F 13/06 141/250 |
| 2003/0183996 | A1* | 10/2003 | Tsujimoto | ............... | F16F 13/06 267/140.11 |

FOREIGN PATENT DOCUMENTS

JP          2004-3528 A         1/2004

* cited by examiner

*Primary Examiner* — Bayan Salone
(74) *Attorney, Agent, or Firm* — Westerman, Hattori, Daniels & Adrian, LLP

(57) ABSTRACT

A method of manufacturing a liquid-sealed antivibration device includes mounting a body component on a liquid tank so that the liquid tank capable of storing a liquid communicates with a liquid-sealed chamber via an opening; supplying the liquid to the liquid tank and the liquid-sealed chamber, storing the liquid in the liquid tank, and charging the liquid in the liquid-sealed chamber; and incorporating an incorporation component into the body component after injecting the liquid from an injection portion toward the incorporation component in a state where the incorporation component is immersed in the liquid stored in the liquid tank.

5 Claims, 7 Drawing Sheets

METHOD OF MANUFACTURING LIQUID-SEALED ANTIVIBRATION DEVICE AND MANUFACTURING APPARATUS OF LIQUID-SEALED ANTIVIBRATION DEVICE

BACKGROUND OF THE INVENTION

Field of the Invention

The present invention relates to a method of manufacturing a liquid-sealed antivibration device and a manufacturing apparatus of a liquid-sealed antivibration device.

Background Art

Figure 7:
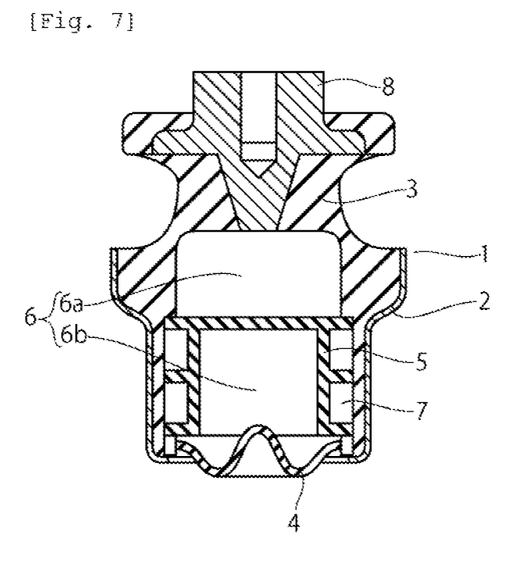
FIG. 7 is a sectional view illustrating an example of a liquid-sealed antivibration device of a manufacturing target.

As a liquid-sealed antivibration device such as an engine mount that supports an automobile engine or the like so as not to transmit vibration of a vibration source such as the automobile engine to a vehicle body side, for example, a liquid-sealed antivibration device illustrated in FIG. 7 is known.

The liquid-sealed antivibration device includes a first mounting tool 8 which is mounted on either of a vibration source side and a support side, a second mounting tool 2 which is mounted on the other of the vibration source side and the support side, an antivibration base body 3 which is interposed between the first mounting tool 8 and the second mounting tool 2 and made of a rubber elastic body, a diaphragm 4 which is supported on a second mounting tool 2 side and forms a liquid-sealed chamber 6 with the antivibration base body 3, and a partition body 5 which partitions the liquid-sealed chamber 6 into upper and lower liquid chambers 6a and 6b. In the liquid-sealed antivibration device, the liquid-sealed chamber 6 seals a liquid and an orifice 7 which communicates with the upper and lower liquid chambers 6a and 6b is provided in the partition body 5, and vibration is damped and absorbed by liquid flow resistance by the orifice 7 or an antivibration effect of the antivibration base body 3.

As a method of manufacturing such a liquid-sealed antivibration device, for example, there is known a method of using a liquid tank for storing a liquid as disclosed in JP-A-2004-3528.

In the method, the antivibration base body 3 is vulcanized and adhered to the first mounting tool 8 and the second mounting tool 2 to form a body component 1 having the liquid-sealed chamber 6 which opens to one end side (for example, a second mounting tool 2 side). The body component 1 is mounted on the liquid tank so that the liquid-sealed chamber 6 communicates with an inside of the liquid tank via an opening provided in the body component 1, the liquid is supplied to the insides of the liquid tank and the liquid-sealed chamber 6, the liquid is stored in the liquid tank, and the liquid is charged in the liquid-sealed chamber 6. In this state, incorporation components such as the partition body 5 and the diaphragm A are immersed in the liquid stored in the liquid tank and fitted into the inside or the opening of the liquid-sealed chamber 6 of the body component 1 to be incorporated, so that the inside of the liquid sealed chamber 6 seals the liquid.

In a case where a liquid-sealed antivibration device is manufactured by such a method, an angle of the incorporation component is changed in the liquid of the liquid tank to remove air attached to the incorporation component and then the incorporation component is incorporated into the body component 1. However, if a shape of the incorporation component becomes complicated, the air may not be completely removed.

SUMMARY OF THE INVENTION

In view of the problem, an object of the present invention is to provide a method of manufacturing a liquid-sealed antivibration device and a manufacturing apparatus of a liquid-sealed antivibration device capable of removing air attached to an incorporation component when an incorporation component is immersed in a liquid stored in a liquid tank and then is incorporated into a body component.

According to the invention, there is provided a method of manufacturing a liquid-sealed antivibration device including a body component that has a liquid-sealed chamber opening to one end side, a liquid which is sealed in the liquid-sealed chamber, and an incorporation component that is incorporated into the body component, the method including: mounting the body component on a liquid tank capable of storing the liquid so that the liquid tank communicates with the liquid-sealed chamber via an opening; supplying the liquid to the liquid tank and the liquid-sealed chamber, storing the liquid in the liquid tank, and charging the liquid in the liquid-sealed chamber; and incorporating the incorporation component into the body component after injecting the liquid from an injection portion toward the incorporation component in a state where the incorporation component is immersed in the liquid stored in the liquid tank.

In addition, according to the invention, there is provided a manufacturing apparatus of a liquid-sealed antivibration device including a body component that has a liquid-sealed chamber opening to one end side, a liquid which is sealed in the liquid-sealed chamber, and an incorporation component that is incorporated into the body component, the apparatus including: a liquid tank which includes a space capable of storing the liquid, and on which the body component is mounted so that the liquid-sealed chamber communicates with the space via the opening; a liquid supply and discharge portion that supplies and discharges the liquid to and from the liquid tank; an incorporating device that holds the incorporation component and incorporates the held incorporation component into the body component through the liquid stored in the liquid tank; and an injection portion that injects the liquid toward the incorporation component in the liquid.

DETAILED DESCRIPTION OF THE INVENTION

First Embodiment

Hereinafter, an embodiment of the invention will be described with reference to the drawings.

FIG. 7 is a sectional view illustrating a liquid-sealed antivibration device (hereinafter, referred to as an "antivibration device") manufactured in the embodiment. The antivibration device includes a body component 1 having a liquid-sealed chamber 6 that opens to one end side (lower end side of FIG. 7), a liquid which is sealed in the liquid-sealed chamber 6, a diaphragm 4 and a partition body 5 which are incorporated into the body component 1.

The body component 1 includes a first mounting tool 8 that is mounted on one side of a vibration source side and a support side, a second mounting tool 2 that is mounted on the other side of the vibration source side and the support side, an antivibration base body 3 that is interposed between the first mounting tool 8 and the second mounting tool 2, and is made of a rubber elastic body.

The second mounting tool 2 is made of a cylindrical member in which the antivibration base body 3 is vulcanized and molded, and the liquid-sealed chamber 6 opening downward is formed below the antivibration base body 3.

The diaphragm 4 is an incorporation component which is made of a flexible rubber film and is provided at a lower end portion of the second mounting tool 2 so as to hermetically close an opening of the liquid-sealed chamber 6. The diaphragm 4 seals a liquid such as water or antifreeze liquid with the antivibration base body 3.

The partition body 5 is an incorporation component which is sealed in the liquid-sealed chamber 6 together with the liquid and divides the liquid-sealed chamber 6 into upper and lower liquid chambers 6a and 6b. An orifice 7 communicating with the upper and lower liquid chambers 6a and 6b is formed in the partition body 5 and the liquid sealed in the liquid-sealed chamber 6 moves between the upper and lower liquid chambers 6a and 6b through the orifice 7.

Next, a manufacturing apparatus of the antivibration DEVICE will be described.

Figure 1:
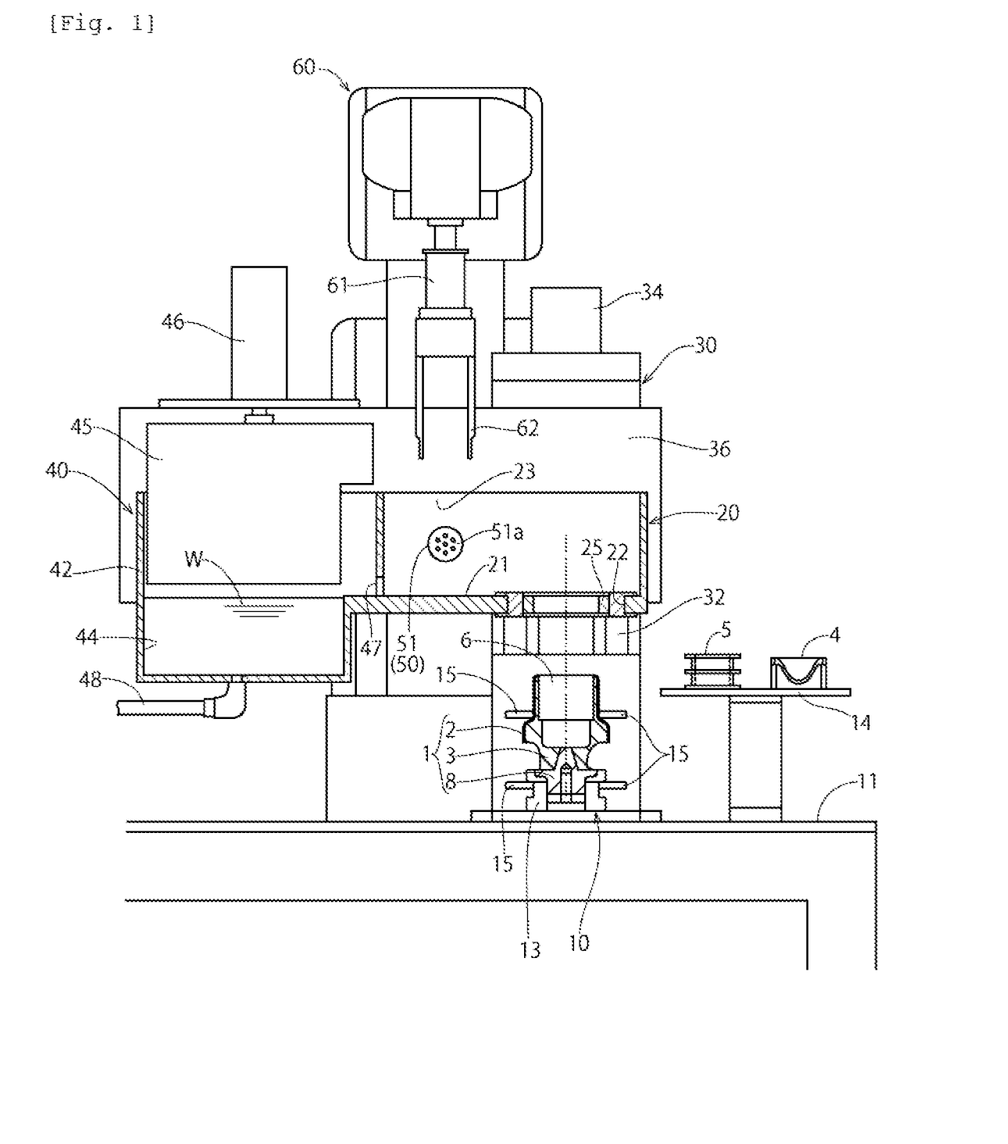
FIG. 1 is a sectional view of a manufacturing apparatus of a liquid-sealed antivibration device according to a first embodiment of the invention.

FIG. 1 is a front view of the manufacturing apparatus of the antivibration DEVICE according to the first embodiment of the invention. In the manufacturing apparatus of the antivibration device of the embodiment, the partition body 5 and the liquid are provided in the liquid-sealed chamber 6, and then the opening of the liquid-sealed chamber 6 is sealed by the diaphragm 4 with respect to the body component 1 which is formed in advance by vulcanizing and adhering the first mounting tool 8 and the second mounting tool 2 to the antivibration base body 3.

In the drawing, reference numeral 10 is a holding portion which supports and fixes the body component t of the antivibration device to a predetermined set position on a machine base 11. The holding portion 10 includes a support portion 13 which supports a first mounting tool 8 of the body component 1 in a state where the opening of the liquid-sealed, chamber 6 faces upward, on the machine base 11. In addition, the holding portion 10 includes a fixing portion 15 which grips and fixes the body component 1 supported by the support portion 13 from a side.

Reference numeral 14 is a component set jig erected on the machine base 11 in the vicinity of the support portion 13 so that the diaphragm 4 and the partition body 5 incorporated into the body component 1 can be supplied and placed at preset fixed positions.

Reference numeral 20 is a liquid tank which is supported so as to be capable of moving up and down by a liquid tank elevating portion 30, above the holding portion 10.

The liquid tank elevating portion 30 is provided so that the liquid tank 20 is caused to descend in a state where the body component 1 is set and fixed to the holding portion 10, is assembled to the body component 1 as described later and incorporation of the partition body 5 and the diaphragm 4 is completed, and then the liquid tank 20 is separated from the body component 1 to ascend.

For example, the liquid tank elevating portion 30 can be configured by using a uniaxial actuator. As illustrated in FIG. 1, in the embodiment, a guide 32 which is erected on the machine base 11 and disposed in a direction perpendicular to an upper surface of the machine base 11, a slider (not illustrated) which is fitted into the guide 32 and provided to be capable of elevating, a driving unit 34 such as a servo motor for rotating a screw shaft meshing with the slider, and a mounting plate 36 which is fixed to the slider are provided, and the liquid tank 20 is mounted on the mounting plate 36. In such a liquid tank elevating portion 30, when the screw shaft is rotated by an operation of the driving unit 34, the liquid tank 20 mounted on the mounting plate 36 together with the slider is provided so as to ascend and descend. The liquid tank elevating portion 30 is configured so as to be capable of controlling a speed, a position or the like in detail when assembling the liquid tank 20 to the body component 1.

As illustrated in FIGS. 1 to 4, a bottom portion 21 of the liquid tank 20 is provided with an opening portion 22 at a position vertically facing the body component 1 held by the holding portion 10. A seal member 25 such as an oil seal is mounted on an inner periphery of the opening portion 22, and if the liquid tank 20 descends, the seal member 25 is fitted into an outer periphery of the upper portion of the body component 1 in a sealed state. The liquid tank 20 can store the liquid of a predetermined amount on the inside of the liquid tank 20 in a state where the body component 1 is fitted into the seal member 25 provided in the opening portion 22.

Reference numeral 40 is a liquid supply and discharge portion which supplies and discharges the liquid to and from the liquid tank 20. The liquid supply and discharge portion 40 includes a liquid storage tank 42 which is provided in the vicinity of the liquid tank 20, a charging float 45, and a cylinder device 46. The liquid supply and discharge portion 40 is connected to the liquid tank 20 via a communication port 47.

The liquid storage tank 42 includes a recessed portion 44 which is recessed downward from a bottom surface of the liquid tank 20 to store a liquid W and the charging float 45 is fitted in the recessed portion 44. The charging float 45 is connected to the cylinder device 46 and is provided to ascend and descend by an operation of the cylinder device 46.

Figure 2:
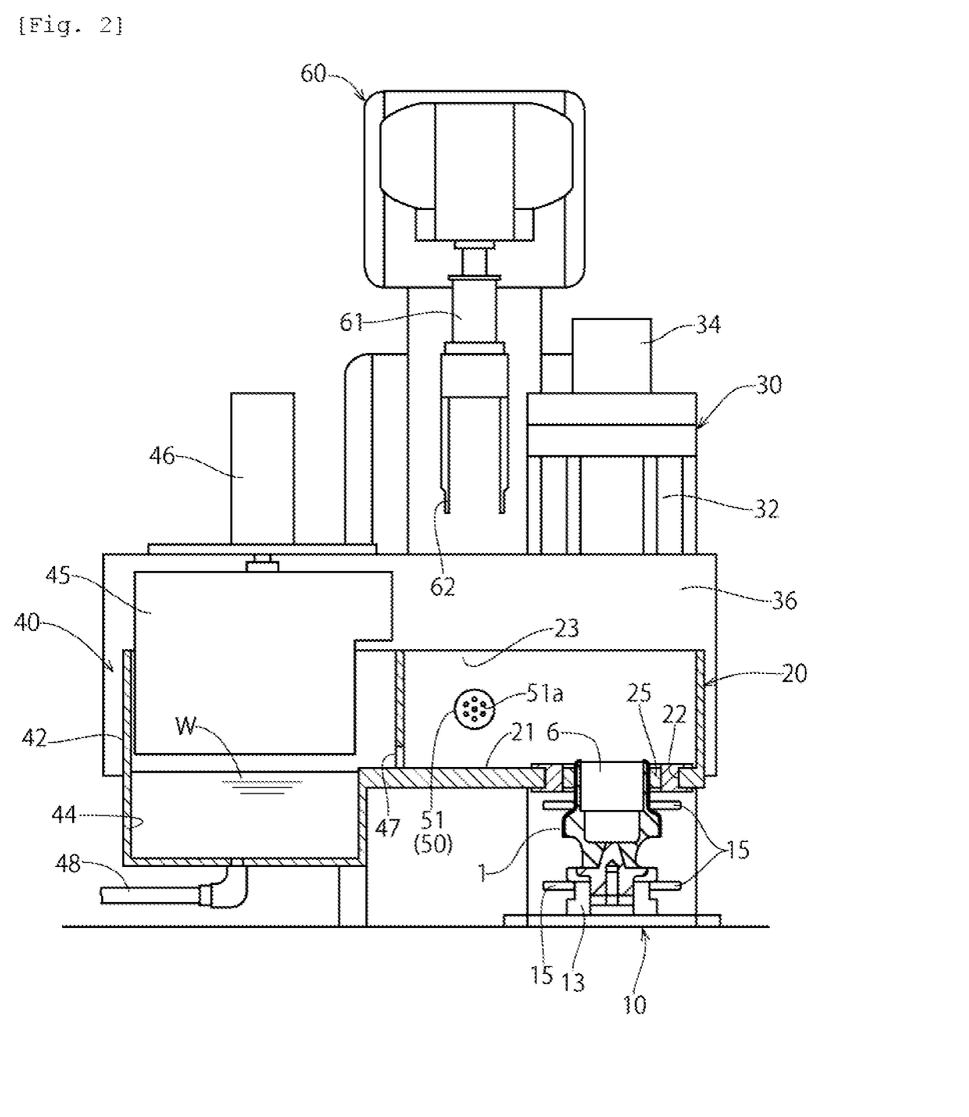
FIG. 2 is a sectional view illustrating a state where a liquid tank of the manufacturing apparatus of FIG. 1 descends.
Figure 3:
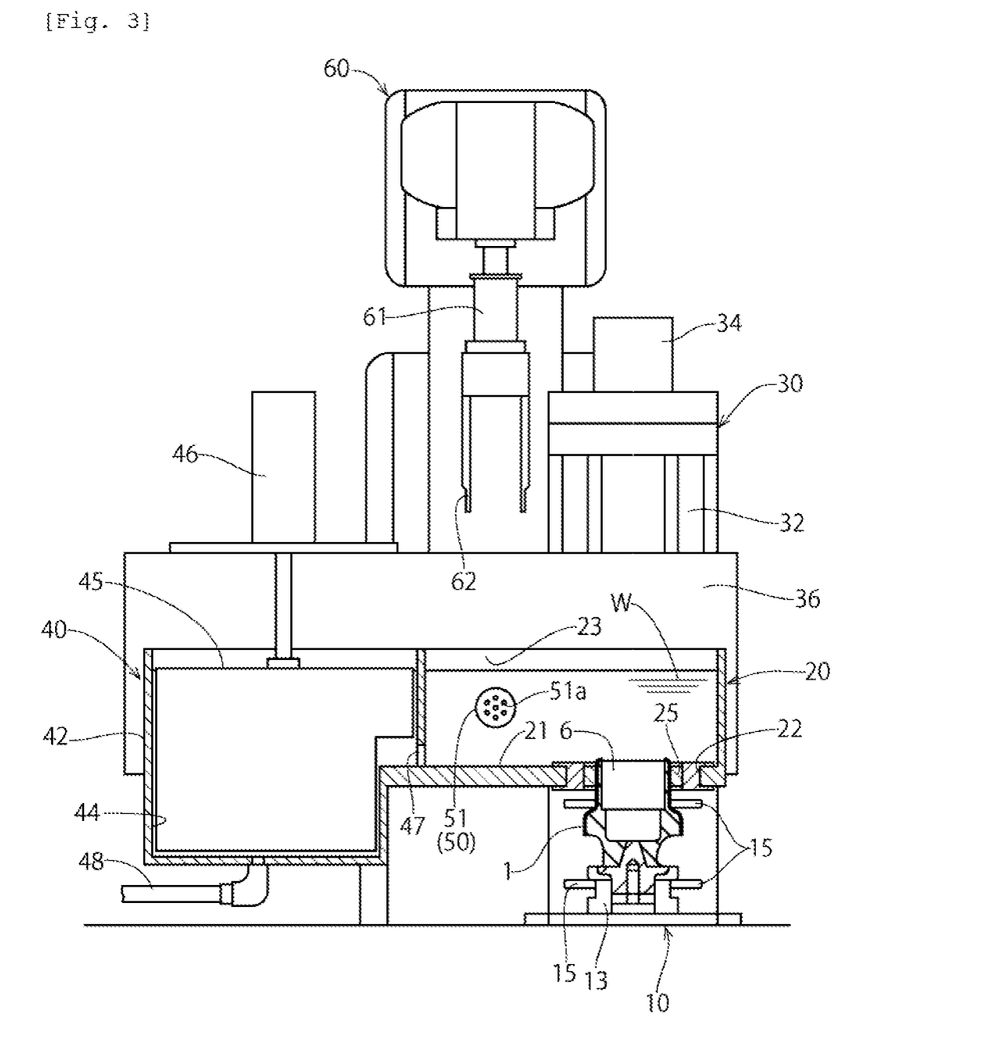
FIG. 3 is a sectional view illustrating a state where a charging float of the manufacturing apparatus of FIG. 1 descends.

In such a liquid supply and discharge portion 40, in a state where the body component 1 is fitted into the seal member 25 of the liquid tank 20, if the charging float 45, which is positioned above the recessed portion 44 as illustrated in FIG. 2, descend to fit in the recessed portion 44 as illustrated in FIG. 3, the liquid W stored in the recessed portion 44 flows to be supplied from the communication port 47 to the liquid tank 20 (see FIG. 3).

In addition, if the charging float 45 ascends from a state where the charging float 45 illustrated in FIG. 3 fits in the recessed portion 44 to a position above the recessed portion 44 as illustrated in FIG. 2, the liquid W in the liquid tank 20 is discharged through the communication port 47 and is stored in the recessed portion 44 of the liquid storage tank 42.

Moreover, a volume of the recessed port ion 44 of the liquid storage tank 42 and a volume of the charging float 45 are set so as to ensure a predetermined liquid surface height necessary for an air cutting operation of the diaphragm 4 and the partition body 5 which are described later when the charging float 45 is fitted in the recessed portion 44 and the liquid W is supplied to the liquid tank 20.

Reference numeral 48 is a supply pipe which is connected to a supply unit (not illustrated) such as a pump for supplying the liquid to the liquid tank 20, and is connected to the bottom portion of the recessed portion 44. In addition, a liquid surface detection sensor (not illustrated), which detects a liquid surface height of the liquid tank 20 when the liquid W is supplied by the liquid supply and discharge portion 40, is provided.

Each time the liquid-sealed chamber 6 of the body component 1 seals the liquid W, the liquid W of the liquid storage tank 42 decreases. However, the supply unit of the liquid is provided to appropriately supply the liquid W in the liquid storage tank 42 so that the liquid surface height detected by the liquid surface detection sensor is equal to or higher than a predetermined height.

In addition, in the manufacturing apparatus of the antivibration device of the embodiment, an injection portion, which is connected to a pump (not illustrated) supplying the liquid W of the recessed portion 44 of the liquid storage tank 42 to the liquid tank 20, is provided on a periphery wall 23 of the liquid tank 20.

Figure 4:
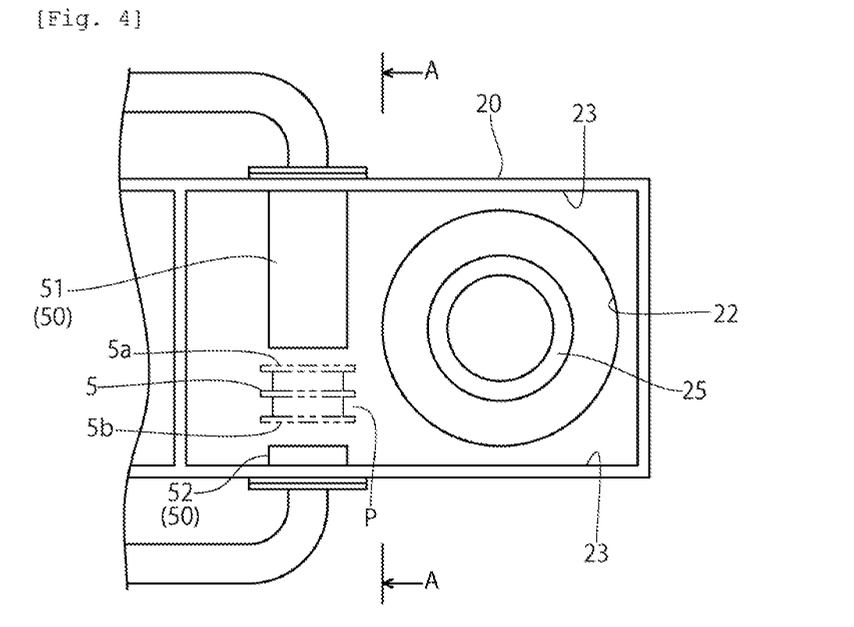
FIG. 4 is a plan view of the liquid tank of the manufacturing apparatus of FIG. 1.
Figure 5:
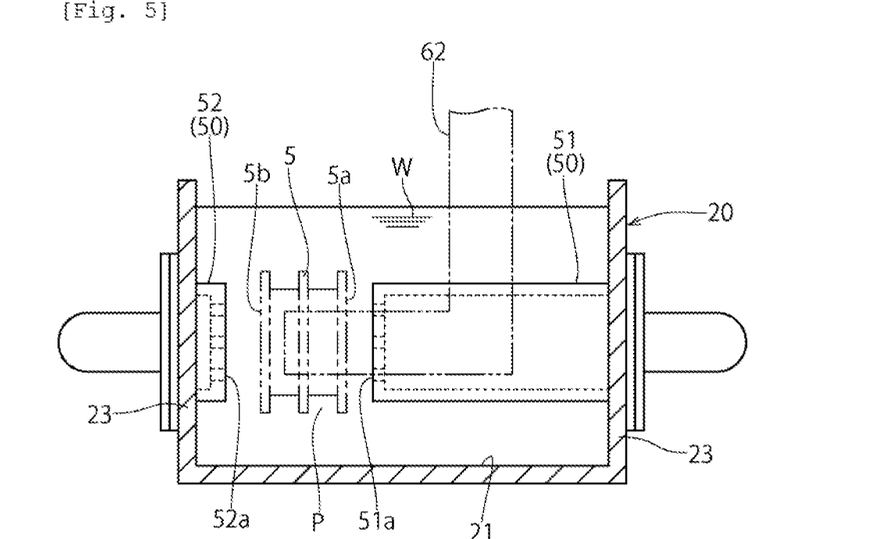
FIG. 5 is a sectional view of line A-A of FIG. 4.

As illustrated in FIGS. 4 and 5, the injection portion includes a first injection portion 51 and a second injection portion 52 which are disposed at positions facing each other, and the liquid W of the liquid storage tank 42 is also supplied from injection ports 51*a* and 52*a* provided in the injection portions 51 and 52 to the liquid tank 20 in addition to the liquid supply and discharge portion 40 which is described above.

The injection port 51*a* and the injection port 52*a* are open to the liquid tank 20 at positions lower than the liquid surface height of the liquid W supplied to the liquid tank 20, and are provided so as to inject the liquid W toward the liquid tank 20 in a horizontal direction.

Moreover, in the embodiment, a case where the first injection portion 51 and the second injection portion 52 injecting the liquid W toward the liquid tank 20 are disposed to face each other is described, but two injection portions may be disposed at positions which do not face each other, or one injection portion may be provided on the periphery wall of the liquid tank 20.

Reference numeral 60 is a component incorporating device configured of a multi-axis articulated robot and a chuck device 62 having a pair of claw pieces, which are freely openable and closable, is provided at a tip portion of a hand 61. The component incorporating device 60 is controlled based on a detection signal from the liquid surface detection sensor. When the liquid surface detection sensor detects that the liquid surface height at the time of liquid supply to the liquid tank 20 reaches a certain level, the component incorporating device 60 starts an operation by a signal from an apparatus control portion which receives the detection signal. In addition, when the liquid surface detection sensor detects that the liquid surface height of the liquid tank 20 is equal to or less than a certain level, the component incorporating device 60 is provided so as to stop the operation.

The component incorporating device 60 stores various position information of the position of the body component 1 which is set and fixed to the holding portion 10, positions of the diaphragm 4 and the partition body 5 which are set in a component set jig 14, the position of the liquid tank 20 in the upward and downward direction when the body component 1 is fitted into the seal member 25 of the liquid tank 20, the liquid surface height in the liquid tank 20, and the like. In addition, the component incorporating device 60 is set and taught to perform an assembling operation with the body component 1 by descending of the liquid tank 20, sequentially chucking the incorporation components such as the partition body 5 and the diaphragm 4 which are set in the component set jig 14 by the chuck device 62, the air cutting operation and the incorporating operation which are described later with respect to the chucked incorporation components 4 and 5. Furthermore, it is provided so as to correct the operation as necessary.

Next, a method, in which the partition body 5 and the liquid are provided in the liquid-sealed chamber 6 of the body component 1 formed in advance, and then the opening of the liquid-sealed chamber 6 is sealed by the diaphragm 4 by using the manufacturing apparatus of the embodiment, will be described with reference to the drawings.

First, the body component 1 is set on the support portion 13 of the holding portion 10 so that the opening of the liquid-sealed chamber 6 provided in the body component 1 faces upward. In addition, the incorporation components such as the partition body 5 and the diaphragm 4 are placed at fixed positions on the component set jig 14 (step S1 of FIG. 6).

Figure 6:
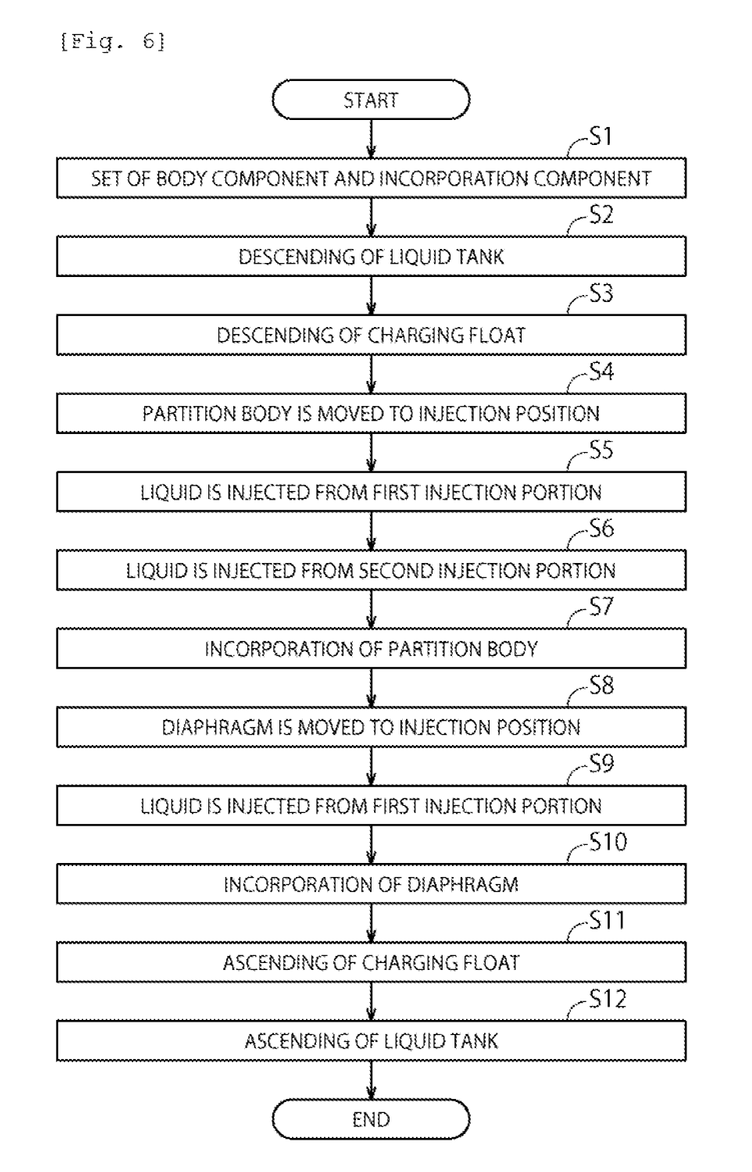
FIG. 6 is a flowchart illustrating a method of manufacturing a liquid-sealed antivibration device according to the first embodiment of the invention.

The fixing portion 15 holds the body component 1 which is set in the support portion 13 of the holding portion 10 and then the driving unit 34 of the liquid tank elevating portion 30 is driven, and as illustrated in FIG. 2, the liquid tank 20 descends along the guide 32 together with the slider and the mounting plate 36, and the outer periphery of the upper portion of the body component 1 is fitted into the seal member 25 provided in the opening portion 22 of the liquid tank 20 in the sealed state (step S2 of FIG. 6).

Next, the charging float 45 descends by the operation of the cylinder device 46 and as illustrated in FIG. 3, the charging float 45 is fitted in the recessed portion 44 provided in the liquid storage tank 42. Therefore, the liquid W stored in the recessed portion 44 flows and is supplied from the communication port 47 to the liquid tank 20, and is supplied to the inside of the liquid-sealed chamber 6 of the body component 1 (step S3 of FIG. 6).

In addition, when the liquid W is supplied to the liquid tank 20, when the liquid surface detection sensor detects that the liquid surface of the liquid W reaches a predetermined height, the component incorporating device 60 operates. In the component incorporating device 60, the partition body 5 of the incorporation components 4 and 5 which are set at predetermined positions on the component set jig 14 is held by the chuck device 62 and is moved to above the liquid tank 20, the held partition body 5 descends, and the partition body 5 is disposed between (hereinafter, the position is referred to as an "injection position P") the first injection portion 51 and the second injection portion 52 provided on the periphery wall 23 of the liquid tank 20 and is immersed in the liquid W stored in the liquid tank 20 (step S4 of FIG. 6).

The liquid W is injected from the first injection portion 51 toward one side 5a of the partition body 5 positioned at the injection position P and air (air bubble) attached to one side 5a of the partition body 5 is removed (step S5 of FIG. 6).

When the liquid W is injected from the first injection portion 51 for a predetermined time period, the injection from the first injection portion 51 is stopped and then the liquid W is injected from the second injection portion 52 toward the other side 5b of the partition body 5, and air attached to the other side 5b of the partition body 5 is removed (step S6 of FIG. 6). Moreover, the injection of the liquid W from the first injection portion 51 is stopped and then the other side 5b of the partition body 5 may be moved close to the second injection portion 52 before injecting the liquid W from the second injection portion 52.

When the liquid W is injected from the second injection portion 52 for a predetermined time period, the injection of the liquid W from the second injection portion 52 is stopped and then the partition body 5 is horizontally returned by the component incorporating device 60 so as to be aligned with the body component 1 and fitted into the opening of the liquid-sealed chamber 6, and incorporated (step S7 of FIG. 6). In this case, the partition body 5 may be incorporated by pushing to a predetermined position of the body component 1 by a cylinder (not illustrated) provided on an upper side.

When the incorporation of the partition body 5 is completed, the component incorporating device 60 holds the diaphragm 4 which is set on the component set jig 14 by the chuck device 62 and is moved to above the liquid tank 20, the held diaphragm 4 descends, and the diaphragm 4 is disposed at the injection position P and is immersed in the liquid W stored in the liquid tank 20 (step S8 of FIG. 6). Moreover, when the diaphragm 4 is mounted on the body component 1, the diaphragm 4 is disposed at the injection position P so that a side facing the liquid-sealed chamber 6 faces the first injection portion 51 or the second injection portion 52 (for example, the first injection portion 51).

The liquid W is injected from one (for example, the first injection portion 51) of the first injection portion 51 or the second injection portion 52 toward a side facing the liquid-sealed chamber 6 when the diaphragm 4 is mounted on the body component 1, in the diaphragm 4 positioned at the injection position P, and air attached to a side of the diaphragm 4 facing the liquid-sealed chamber 6 is removed (step S9 of FIG. 6).

When the liquid W is injected from the first injection portion 51 for a predetermined time period, the injection of the liquid W from the first injection portion 51 is stopped and then the diaphragm 4 is horizontally returned by the component incorporating device 60 so as to be aligned with the body component 1 and incorporated into the opening of the liquid-sealed chamber 6, the opening of the liquid-sealed chamber 6 is sealed by the diaphragm 4, and the liquid is sealed in the liquid-sealed chamber 6 (step S10 of FIG. 6). In this case, the diaphragm 4 may be incorporated to a predetermined position of the body component 1 by a cylinder (not illustrated) as necessary.

As described above, all the incorporation components 4 and 5 are incorporated into the body component 1 and then the hand 61 is moved to an original position to prepare a next incorporating operation. In addition, the charging float 45 ascends by an operation of the cylinder device 46, and thereby the liquid W returns to the recessed portion 44 of the liquid storage tank 42 and is discharged from the inside of the liquid tank 20 (step S11 of FIG. 6).

Thereafter, the liquid tank 20 ascends by an operation of the liquid tank elevating portion 30, the body component 1 is separated from the seal member 25, holding of the body component 1 by the fixing portion 15 is released and then the assembled antivibration device is taken out from the holding portion 10, and the assembly is completed (step S12 of FIG. 6). Moreover, in the assembled antivibration device, a post-step such as caulking may be performed as necessary.

As described above, in the embodiment, in a state where the incorporation components such as the diaphragm 4 and the partition body 5 are immersed in the liquid tank 20 in which the liquid W is stored, since the liquid W is injected from the injection portions 51 and 52 toward the incorporation components 4 and 5, the incorporation components 4 and 5 can be incorporated into the body component 1 while removing the attached air.

In addition, in the embodiment, the first injection portion and the second injection portion, which are disposed to face each other as the injection portions for injecting the liquid W with respect to the incorporation components 4 and 5, are provided, and the liquid W can be injected into both sides of the incorporation components 4 and 5 without changing the orientation of the incorporation components 4 and 5 in the liquid tank 20. Therefore, it is possible to reduce a time to incorporate the incorporation components 4 and 5 into the body component 1.

Second Embodiment

Next, a second embodiment of the invention will be described with reference to FIG. 8. Moreover, the same reference numerals are given to the same configurations as those of the first embodiment and the description of the configurations will be omitted.

In the first embodiment, a case where the incorporation components 4 and 5 are disposed at the injection position P and is immersed in the liquid W stored in the liquid tank 20, and then the liquid W is injected from the first injection portion 51 and the second injection portion 52 is described, but in the embodiment, before incorporation components 4 and 5 are immersed in a liquid W stored in a liquid tank 20, an air discharging step of injecting the liquid W from a first injection portion 51 and a second injection portion 52 is executed and then the incorporation components 4 and 5 are immersed in the liquid W stored in the liquid tank 20, and the liquid W may be injected from the first injection portion 51 and the second injection portion 52 toward the incorporation components 4 and 5.

Figure 8:
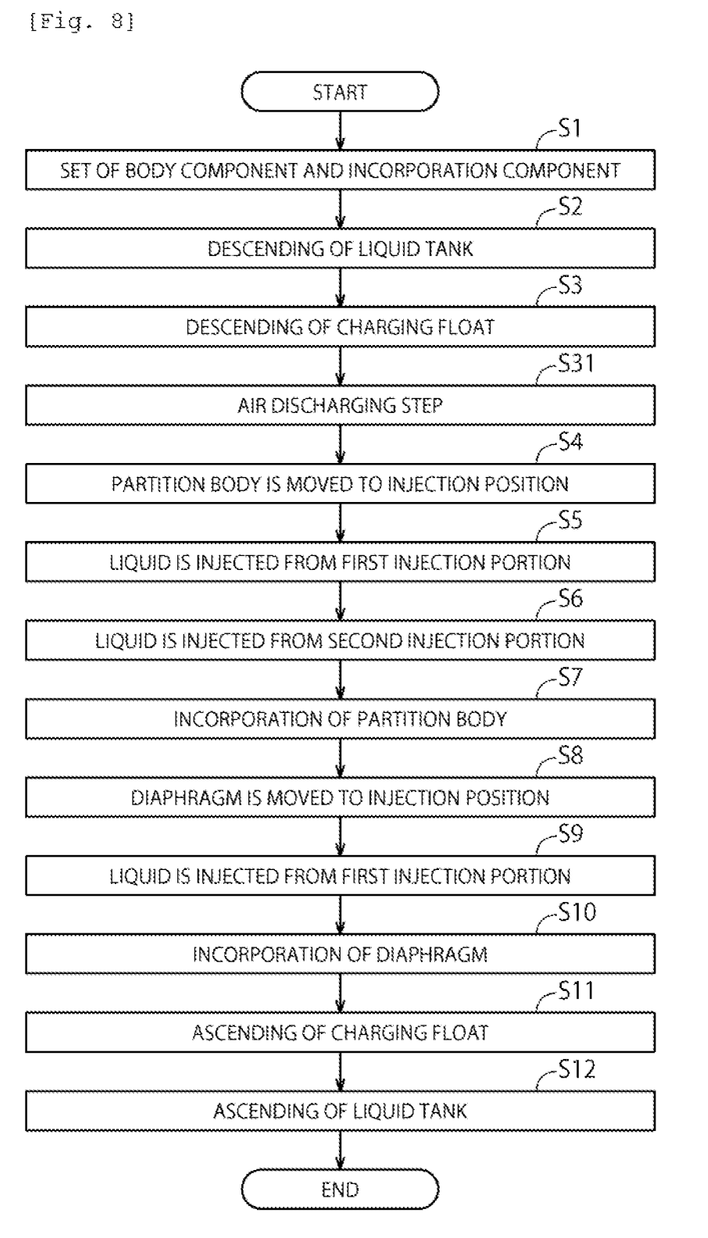
FIG. 8 is a flowchart illustrating a method of manufacturing a liquid-sealed antivibration device according to a second embodiment of the invention.

Specifically, similar to step S1 to step S3 in the first embodiment, the body component 1 and the incorporation components 4 and 5 are set in a support portion 13 and a component set jig 14 (step S1 of FIG. 8), the liquid tank 20 descends (step S2 of FIG. 8), and a charging float descends (step S3 of FIG. 8).

Before the partition body 5 is moved to the injection position P, the liquid W is injected from the first injection portion 51 and the second injection portion 52 so that an air discharging step of discharging the air accumulated in the first injection portion 51 and the second injection portion 52 is executed (step S31 of FIG. 8). When the liquid W is injected from the first injection portion 51 and the second injection portion 52 for a predetermined time period, discharging of the air accumulated in the first injection portion 51 and the second injection portion 52 is completed so that the air discharging step is completed.

Similar to step S4 to step S12 in the first embodiment, the partition body 5 is disposed at the injection position P and is immersed in the liquid W stored in the liquid tank 20 (step S4 of FIG. 8) and then the liquid W is injected from the first injection portion 51, and the air attached to one side 5a of the partition body 5 is removed (step S5 of FIG. 8), the liquid W is injected from the second injection portion 52, the air attached to the other side 5b of the partition body 5 is removed (step S6 of FIG. 8), the partition body 5 is incorporated into the body component 1 (step S1 of FIG. 8), the diaphragm 4 is moved to the injection position P and is immersed in the liquid W (step S8 of FIG. 8), the liquid W is injected from the first injection portion 51, the air attached to the diaphragm 4 is removed (step S9 of FIG. 8), the diaphragm 4 is incorporated into the body component 1 (step S10 of FIG. 8), the charging float ascends (step S11 of FIG. 8), the liquid tank 20 ascends, the assembled antivibration device is taken out from the holding portion 10, and the assembly is completed (step S12 of FIG. 8).

Since the injection port 51a and the injection port 52a are opened to the liquid tank 20, in a state where the liquid W does not exist in the liquid tank 20, air is accumulated on the inside of the first injection portion 51 and the second injection portion 52, and if the liquid W is injected from the first injection portion 51 and the second injection portion 52 in which the air is accumulated, toward the incorporation components 4 and 5, there is a concern that the relevant air is attached to the incorporation components 4 and 5.

However, in the embodiment, after supply of the liquid W from the liquid storage tank 42 to the liquid tank 20 is started and before an initial incorporation component 4 and 5 are moved to the injection position P, the liquid W is injected from the first injection portion 51 and the second injection portion 52 and then the incorporation components 4 and 5 are immersed in the liquid W stored in the liquid tank 20, the liquid W is injected from the first injection portion 51 and the second injection portion 52 toward the incorporation components 4 and 5. Therefore, the liquid W can be injected into the incorporation components 4 and 5 after discharging the air accumulated in the first injection portion 51 and the second injection portion 52, attachment of the air accumulated in the first injection portion 51 and the second injection portion 52 to the incorporation components 4 and 5 can be suppressed.

Moreover, in the embodiment described above, descending of the charging float 45 is started and then the air discharging step is executed, but the air discharging step can be started at any timing from when the liquid tank 20 descends and the outer periphery of the upper portion of the body component 1 is fitted into the seal member 25 in a sealed state until before the initial incorporation component 5 is moved to the injection position P. However, it is preferable that before the injection port 51a of the first injection portion 51 and the injection port 52a of the second injection portion 52 are immersed in the liquid W, the air discharging step is started. As described above, before the injection port 51a and the injection port 52a are immersed in the liquid W, the air discharging step is started, so that the air accumulated in the first injection portion 51 and the second injection portion 52 is not discharged to the liquid W of the liquid tank 20. Therefore, occurrence of air bubbles in the liquid W of the liquid tank 20 can be suppressed and attachment of the air bubble to the incorporation components 4 and 5 can be suppressed.

In addition, in a case where the air discharging step is started before the injection port 51a and the injection port 52a are immersed in the liquid W, in order to prevent accumulation of air again in the first injection portion 51 and the second injection portion 52 after the air discharging step, it is preferable that the air discharging step is continued by injecting the liquid W from the first injection portion 51 and the second injection portion 52 until the injection port 51a and the injection port 52a are immersed in the liquid W after the air discharging step is started.

Furthermore, in a case where the air discharging step is started before the injection port 51a and the injection port 52a are immersed in the liquid W, it is preferable that an injection amount of the liquid W injected by the first injection portion 51 and the second injection portion 52 in the air discharging step is smaller than an injection amount of the liquid W when the liquid W is injected toward the incorporation components 4 and 5. Therefore, scattering of the liquid W injected during the air discharging step to the outside of the liquid tank 20 can be suppressed.

Other Embodiments

Although the embodiments of the invention are described, the embodiments are presented as an example, and are not intended to limit the scope of the invention. This novel embodiment can be implemented in various other forms and various omissions, substitutions, and changes can be made without departing from the gist of the invention.

What is claimed is:

1. A method of manufacturing a liquid-sealed antivibration device including a body component that has a liquid-sealed chamber opening to one end side, a liquid which is sealed in the liquid-sealed chamber, and an incorporation component that is incorporated into the body component, the method comprising:
    mounting the body component on a liquid tank capable of storing the liquid so that the liquid tank communicates with the liquid-sealed chamber via an opening;
    supplying the liquid to the liquid tank and the liquid-sealed chamber, storing the liquid in the liquid tank, and charging the liquid in the liquid-sealed chamber; and
    incorporating the incorporation component into the body component after injecting the liquid from an injection portion toward the incorporation component in a state where the incorporation component is immersed in the liquid stored in the liquid tank.

2. The method of manufacturing a liquid-sealed antivibration device according to claim 1,
    wherein the injection portion includes a first injection portion and a second injection portion which are disposed to face each other, the first injection portion injects the liquid toward one side of the incorporation component, and the second injection portion injects the liquid toward the other side of the incorporation component.

3. The method of manufacturing a liquid-sealed antivibration device according to claim 1,
    wherein before the incorporation component is immersed in the liquid stored in the liquid tank, the liquid is injected from the injection portion and then the incorporation component is immersed in the liquid stored in the liquid tank, and the liquid is injected from the injection portion toward the incorporation component.

4. The method of manufacturing a liquid-sealed antivibration device according to claim 3,
    wherein before the injection portion is immersed in the liquid, the injection of the liquid is started, the injection portion is immersed in the liquid and then the incorporation component is immersed in the liquid stored in the liquid tank, and the liquid is injected from the injection portion toward the incorporation component.

5. The method of manufacturing a liquid-sealed antivibration device according to claim 4, wherein an injection amount of the liquid which is injected from the injection portion before the injection portion is immersed in the liquid is smaller than an injection amount of the liquid when the liquid is injected toward the incorporation component.

\* \* \* \* \*